United States Patent [19]
Yoshimaru

[11] 4,394,696
[45] Jul. 19, 1983

[54] APPARATUS FOR POSITIONING MAGNETIC HEAD TO POSITION CORRESPONDING TO REFERENCE TRACK ON MAGNETIC TAPE

[75] Inventor: Tomohisa Yoshimaru, Yokohama, Japan

[73] Assignee: Tokyo Shibaura Denki Kabushiki Kaisha, Kawasaki, Japan

[21] Appl. No.: 248,288

[22] Filed: Mar. 27, 1981

[30] Foreign Application Priority Data

Apr. 1, 1980 [JP] Japan .................................. 55-42437

[51] Int. Cl.³ ........................ G11B 21/08; G11B 5/55; G11B 17/00
[52] U.S. Cl. .................................... 360/78; 360/72.2; 360/106
[58] Field of Search ...................... 360/78, 74.7, 74.6, 360/106, 72.2, 74.4, 106

[56] References Cited
U.S. PATENT DOCUMENTS

| | | | |
|---|---|---|---|
| 3,676,609 | 7/1972 | Coyle | 360/78 |
| 4,313,141 | 1/1982 | Yanagida | 360/78 |
| 4,315,286 | 2/1982 | Copeland | 360/72.2 |
| 4,323,935 | 4/1982 | Koizumi | 360/74.4 |
| 4,333,116 | 6/1982 | Schoettle | 360/106 |

FOREIGN PATENT DOCUMENTS 2550678 5/1976 Fed. Rep. of Germany .

OTHER PUBLICATIONS

Hall et al., "Self-Contained Magnetic Stripe Reader/Encoder", IBM Tech. Disc. Bull., vol. 20, No. 5, pp. 1879-1880, Oct. 1977.

Primary Examiner—Robert M. Kilgore
Attorney, Agent, or Firm—Cushman, Darby & Cushman

[57] ABSTRACT

Apparatus for positioning a magnetic head at a position corresponding to a reference track for use in a magnetic tape apparatus, in which the magnetic head is moved by a stepper motor in a direction perpendicular to the running direction of a magnetic tape formed with a plurality of data tracks. A detector such as a microswitch for detecting the arrival of the magnetic head at the neighborhood of a position corresponding to the reference track is provided. A control circuit stops the stepper motor for stopping the magnetic head at the reference position in response to the excitation of a previously selected phase winding of the stepper motor after detection of the arrival of the magnetic head at the neighborhood of the position corresponding to the reference track by the detector.

2 Claims, 4 Drawing Figures

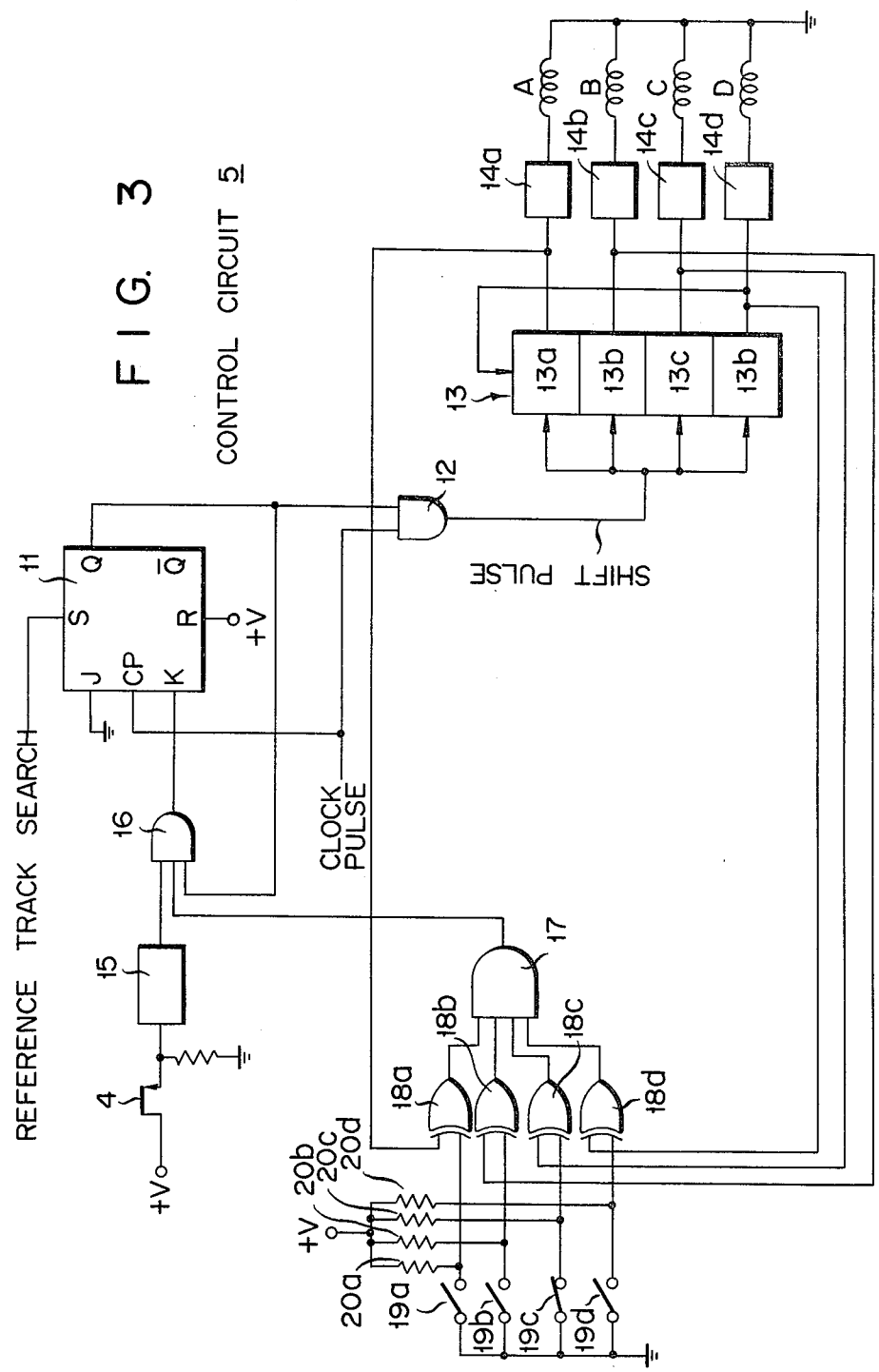

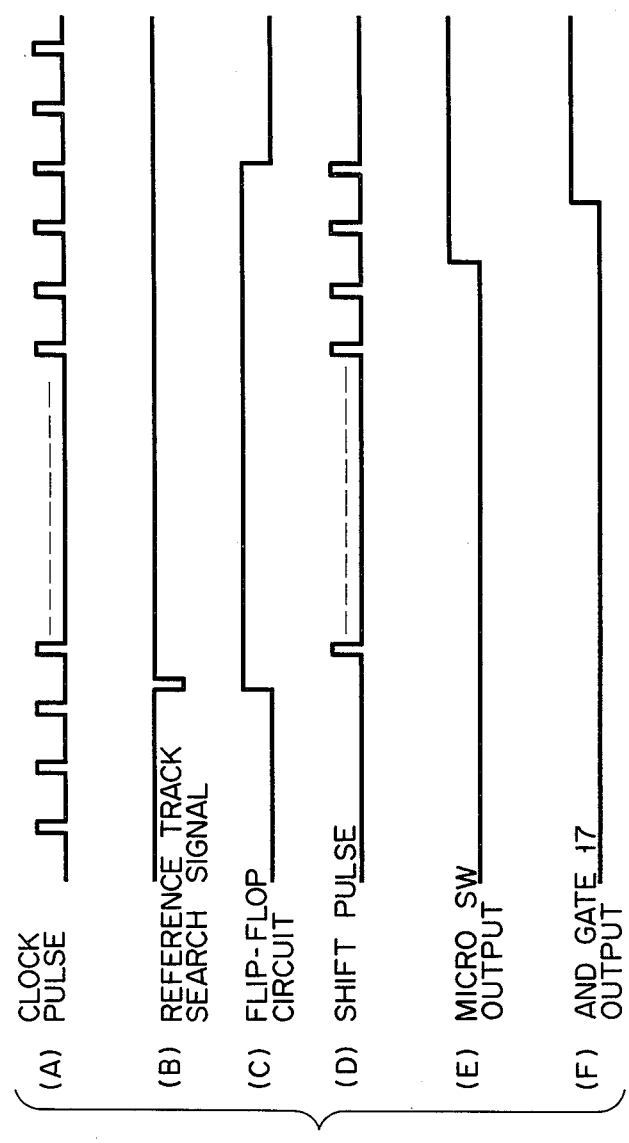

APPARATUS FOR POSITIONING MAGNETIC HEAD TO POSITION CORRESPONDING TO REFERENCE TRACK ON MAGNETIC TAPE

BACKGROUND OF THE INVENTION

This invention relates to an apparatus for positioning a magnetic head at a reference position, which is used in a magnetic tape apparatus for an image file information retrieval system or the like.

Recently, image information filing systems have been developed for rationalizing the filing of documents in offices. In the image information filing system, image information such as a great deal of documents produced in the office is optically read out and recorded on an endless magnetic tape having a number of information tracks in a magnetic tape apparatus, and the recorded image information is retrieved to read out desired image information so that user may have access to the information in a visible form. In the magnetic tape apparatus for such a system, a desired information track is selected by moving the magnetic head in the width direction of the magnetic tape using a stepper motor.

In such a magnetic tape apparatus, it is required that no deviation of the magnetic head from the position corresponding to each information track on the magnetic tape would result. To meet this requirement, the magnetic head has to be moved with respect to a position corresponding to a predetermined information track, i.e., reference track, on the magnetic tape. In a prior art apparatus, a microswitch or sensitive switch for detecting the magnetic head is provided at a position corresponding to the reference track on the magnetic tape. When a power is first applied to the apparatus, the magnetic head is previously moved, and upon actuation of the microswitch, i.e., upon arrival of the head to a position corresponding to the reference track, the head is detected to be at the reference position thereof. With the prior art apparatus, however, it is likely that the head fails to accurately correspond to the reference track at the time of the actuation of the microswitch due to variations in the operation thereof. Therefore, it is difficult to obtain an accurate reference position of the head.

SUMMARY OF THE INVENTION

An object of the invention is to provide an apparatus for accurately positioning the magnetic head, which is moved by a stepper motor in a direction perpendicular to the direction of running of a magnetic tape having a plurality of information tracks, to a reference position corresponding to a reference track on the tape, thus eliminating the deviation of the head from the position corresponding to each track.

According to the invention, a detector such as a microswitch is provided for detecting the arrival of the magnetic head at the neighborhood of the reference track. A control circuit, which drives the stepper motor for moving the magnetic head through successive excitation of the phase windings thereof, functions to stop the stepper motor for stopping the magnetic head at the reference position in response to the excitation of a previously selected phase winding of the stepper motor after the detection of the arrival of the magnetic head to the neighborhood of the reference track by the detector.

BRIEF DESCRIPTION OF THE DRAWINGS

FIG. 3 is a schematic circuit diagram of a control circuit shown in FIG. 1.

FIG. 4, including A–F, is a time chart for illustrating the operation of the control circuit shown in FIG. 3.

DESCRIPTION OF THE PREFERRED EMBODIMENT

Figure 1:
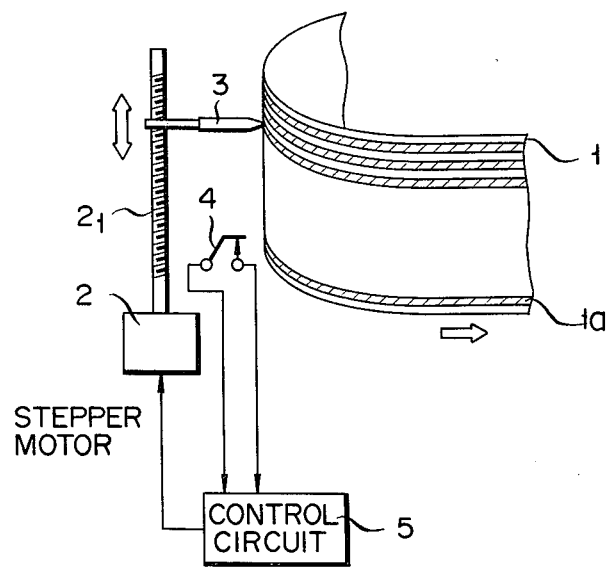
FIG. 1 is a schematic view showing the essential part of the magnetic tape apparatus embodying the invention.

FIG. 1 shows the essential part of the magnetic tape apparatus according to the invention. In the Figure, designated as 1 is an endless magnetic tape running in the direction of arrow. On the tape a number of information tracks extending in its running direction are formed. A magnetic head 3 is mounted on a threaded shaft $2_1$ of a stepper motor 2, and it is moved in the width direction of the tape as the shaft $2_1$ is rotated by the motor 2.

A switch 4, for instance, a microswitch, for detecting the magnetic head 3 is provided at a position corresponding to the lowermost one 1a of information tracks on the magnetic tape 1 (hereinafter referred to as reference track). The microswitch 4 is actuated, i.e., turned on, when its actuator is touched by the magnetic head 3. In the apparatus according to the invention, the position of the microswitch 4 is adjusted such that it is actuated when the magnetic head 3 comes to the neighborhood of the reference track 1a. In other words, according to the invention the microswitch 4 need not be positioned accurately at a position corresponding to the reference track 1a.

Figure 2:
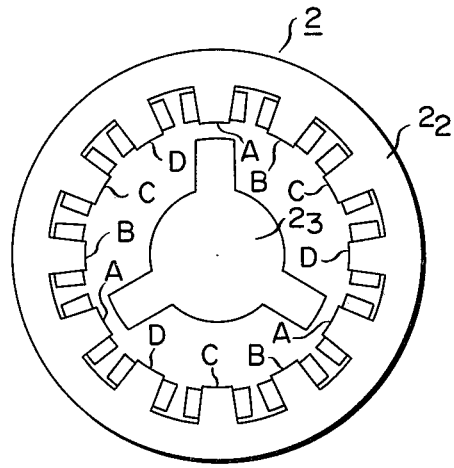
FIG. 2 is a schematic view showing the internal construction of the stepper motor shown in FIG. 1.

The output of the microswitch 4 is coupled to a stepper motor drive control circuit 5. The stepper motor 2 is driven by drive pulses supplied from the control circuit 5 for moving the magnetic head 3 vertically, i.e., in the direction of the tape width. FIG. 2 shows an example of the internal construction of the stepper motor 2. As is shown, the stepper motor 2 includes a stator $2_2$ provided with 4-phase windings A, B, C and D arranged along the inner periphery and a three-pole rotor $2_3$. The 4-phase windings A, B, C and D are successively excited by drive pulses supplied from the control circuit 5, whereby the rotor $2_3$ is rotated such that its poles are brought to a position corresponding to the excited phase winding.

In the above construction, like the prior art, when the power is first applied to the apparatus, the control circuit 5 continuously supplies drive pulses to the stepper motor 2 to cause downward movement of the magnetic head 3. When the head 3 being lowered strikes the actuator of the microswitch 4, the microswitch 4 is actuated, whereby the arrival of the head 3 at the neighborhood of the reference track 1a is detected. The phase winding of the stepper motor 2 which is excited at this moment can be known in advance. Thereafter, when the poles of rotor $2_3$ of the stepper motor 2 face a predetermined phase winding, the control circuit 5 stops the supply of drive pulses to the stepper motor 2, thus stopping the stepper motor. When the stopper motor 2 is stopped, the magnetic head 3 is found at a position corresponding to the reference track 1a.

Actually, the magnetic head 3 and microswitch 4 are preliminarily mechanically adjusted such that, for instance, with the actuation of the microswitch 4 the phase winding A is excited and at a subsequent instant when the phase winding C is excited the head is placed at a reference position corresponding to the reference track. To this end, the control circuit 5 is provided with phase specifying switches, and the control circuit compares a phase specified by the phase specifying switch with a phase being actually excited and stops the stepper motor 2 when a coincidence occurs.

An example of the control circuit will now be described with reference to FIG. 3. While the control circuit is acutally constructed so as to vertically move the head, FIG. 3 shows only a part of the circuit that is necessary for the positioning of the head at the reference position for the sake of simplifying the description.

A reference track search signal which is generated when the power is first applied to the apparatus or when desired, is applied to the set terminal S of a flip-flop circuit 11, so that the Q output thereof coupled to an AND gate 12 goes high. A clock pulse signal is supplied to the clock terminal CK of the flip-flop circuit 11 and also to the AND gate 12. During the period that the AND gate 12 is enabled, the clock pulse signal is supplied as shift pulse signal to a recirculating shift register 13 having four-bit stages 13a to 13d as shown in FIG. 4D. In the shift register 13, a bit of logic level "1" is preset in a predetermined stage and bits of logic level "0" in the remaining three stages by a presetting circuit (not shown) at the time of the application of power. These preset four bits are circulated through the shift register 13 by the shift pulse signal. The individual bit stages 13a to 13d of the shift register 13 are connected through amplifiers 14a to 14d to the 4-phase windings A to D of the stepper motor 2. Thus, the 4-phase windings A to D are successively excited by the outputs of the shift register 13.

The microswitch 4 is connected at one end to a positive supply voltage terminal +V and at the other end to an amplifier 15, which has its output terminal connected to one input terminal of an AND gate 16 having its output terminal connected to the K terminal of the flip-flop circuit 11. The Q output terminal of the flip-flop circuit 11 is also connected to another input terminal of the AND gate 16. The output terminal of an AND gate 17, which receives the outputs of EXCLUSIVE-OR gates 18a to 18d, is connected to a further input terminal of the AND gate 16. The outputs of the shift register stages 13a to 13d are connected to the inputs of the respective EXCLUSIVE-OR gates 18a to 18d. The other input terminals of the EXCLUSIVE-OR gates 18a to 18d are connected through respective phase selection switches 19a to 19d to ground and also connected through resistors 20a to 20d to the positive power supply terminal +V.

Now, the operation of the control circuit shown in FIG. 3 will be described with reference to FIGS. 4A through 4F. FIG. 4A shows the clock pulse signal supplied to the flip-flop circuit 11 and also to the AND gate 12, FIG. 4B shows the reference track search signal, FIG. 4C shows the Q output of the flip-flop circuit 11, FIG. 4D shows the shift pulse signal applied to the shift register 13 from the AND gate 12, FIG. 4E shows the output of the microswitch 4, and FIG. 4F shows the output of the AND gate 17.

When the reference track search signal goes low as shown in FIG. 4B, the flip-flop circuit 11 is set so that its Q output goes high as shown in FIG. 4C. As a result, the AND gate 12 is enabled, whereby the clock pulse signal is coupled as the shift pulse signal to the shift register 13. Due to the shifting action of the shift register 13, the 4-phase windings A to D are successively excited, whereby the stepper motor 2 is driven to cause downward movement of the magnetic head 3. When the magnetic head 3 being downwardly moved comes to the neighborhood of the reference track 1a, the microswitch 4 is actuated as mentioned previously by the magnetic head 3. As a result, the output of the microswitch 4 goes high as shown in FIG. 4E. As mentioned previously, the phase winding A is being excited at this moment. Also as mentioned previously, the switch 19c corresponding to the C phase is selectively closed at this time.

When the phase winding A is being excited, the outputs of the EXCLUSIVE-OR gates 18a and 18c are low, while the outputs of the EXCLUSIVE-OR gates 18b and 18d are high. Thus, the output of the AND gate 17 is low. When the phase winding C is excited after the phase windings A and B are successively excited, the outputs of the exclusive OR gates 18a to 18d all go high. As a result, the output of the AND gate 17 goes high as shown in FIG. 4F. Since, at this time, the outputs of the microswitch 4 and the flip-flop circuit 11 are both high, the output of the AND gate 16 goes high in response to the output of AND gate 17 going high. The Q output of the flip-flop circuit 11 goes low by the next clock pulse coming after the K input of the flip-flop circuit 11 going high, as shown in FIG. 4C. As a result, the AND gate 12 is disabled to stop the shifting operation of the shift register 13. Consequently, the phase winding C is continuously excited, and the movement of the magnetic head 3 is stopped. At this time, the magnetic head is positioned at the reference position corresponding to the reference track. It will thus be seen that if a mechanical adjustment is made such that the magnetic head comes to a position corresponding to the reference track when the stepper motor comes to a stop after the actuation of the microswitch, the accurate reference position of the head can be subsequently obtained.

While in the above embodiment a mechanical switch such as a microswitch is used for detecting the position of the magnetic head, it is also possible to use a optical detecting means using a photo-coupler. Since the optical detecting means is also subject to variations in its operation, the invention is effectively applicable to the magnetic head positioning apparatus using an optical detector.

What is claimed is:

1. In a magnetic tape apparatus provided with a magnetic head movable in a direction perpendicular to the direction of running of a magnetic tape having a plurality of data tracks extending in the running direction thereof and a stepper motor for moving the magnetic head in the direction perpendicular to the running direction of the tape with respect to a reference position corresponding to a reference track of the tape, said stepper motor including a rotor and a plurality of phase windings successively excited by a drive pulse signal, apparatus for positioning said magnetic head to said reference position comprising:
   detecting means for detecting the arrival of said magnetic head at the neighborhood of said reference position when said head is moved toward said reference position;
   a plurality of selectable switches for specifying the phase and the corresponding phase winding which will be excited when said head is at said reference position; and control circuit means connected to said detecting means, said switches and said stepper motor for causing said stepper motor to stop said magnetic head at said reference position when the previously specified phase winding of said step motor is excited after the detection of arrival of said magnetic head at the neighborhood of said reference position by said detecting means to thereby obtain the reference position of said magnetic head.

2. The apparatus according to claim 1, wherein said control circuit means includes:

a shift register for supplying drive pulses to the phase windings of said stepper motor for successively exciting said phase windings in response to a shift pulse signal;

logic circuit means connected to said shift register and switches for comparing the phase of a phase winding being excited by said shift register with the phase selected by said switches to produce an output signal when a coincidence occurs; and circuit means coupled to said detecting means and logic circuit means for stopping the shifting operation of said shift register in response to the output signal of said logic circuit means after the detection of the arrival of said magnetic head at the neighborhood of said reference position by said detecting means.

* * * * *